United States Patent
Schmitz et al.

(10) Patent No.: US 6,949,196 B2
(45) Date of Patent: Sep. 27, 2005

(54) METHODS AND SYSTEMS FOR IMPROVED DOSING OF A CHEMICAL TREATMENT, SUCH AS CHLORINE DIOXIDE, INTO A FLUID STREAM, SUCH AS A WASTEWATER STREAM

(75) Inventors: Wilfried J. Schmitz, Jacksonville, FL (US); David Francis, S. Jacksonville, FL (US)

(73) Assignee: FKOS, LLC, St. Augustine, FL (US)

( * ) Notice: Subject to any disclaimer, the term of this patent is extended or adjusted under 35 U.S.C. 154(b) by 0 days.

(21) Appl. No.: 10/628,871

(22) Filed: Jul. 28, 2003

(65) Prior Publication Data

US 2005/0023224 A1 Feb. 3, 2005

(51) Int. Cl.$^7$ .................................................. C02F 1/76
(52) U.S. Cl. ........................ 210/739; 210/754; 210/103; 210/143; 210/199
(58) Field of Search ................................ 210/739, 754, 210/764, 97, 103, 143, 198.1, 199

(56) References Cited

U.S. PATENT DOCUMENTS

| | | | |
|---|---|---|---|
| 4,435,291 A | | 3/1984 | Matsko |
| 4,544,489 A | * | 10/1985 | Campbell et al. ........... 210/709 |
| 5,011,613 A | | 4/1991 | Feray et al. |
| 5,342,510 A | * | 8/1994 | Eden et al. ................. 210/96.1 |
| 5,827,434 A | * | 10/1998 | Yando ........................ 210/754 |
| 5,869,342 A | | 2/1999 | Stannard et al. |
| 6,129,104 A | * | 10/2000 | Ellard et al. .................... 137/3 |
| 6,156,191 A | * | 12/2000 | Overman ................... 210/96.1 |
| 6,346,198 B1 | * | 2/2002 | Watson et al. .............. 210/739 |

FOREIGN PATENT DOCUMENTS

JP 51130055 11/1976

OTHER PUBLICATIONS

Raymond Kudukis, Problems Involved in Automating the Waste–Water–Treatment Plant, Instrumentation Control and Automation for Waste–Water Treatment Systems, ed., 1974, Ch. 10, pp. 74–78, Andrews et al. Permagon NY USA.

Wastewater Disinfection—Manual of Practice FD–10, pp. 144–155, Water Environmental Federation, 1996, Alexandria, VA USA.

W.J. Masschelein, Chlorine Dioxide, Chemistry and Environmental Impact of Oxychlorine Compounds, pp. 112–145, 1979.

* cited by examiner

*Primary Examiner*—Frank M. Lawrence
(74) *Attorney, Agent, or Firm*—Morrison & Foerster LLP

(57) ABSTRACT

The invention is directed to methods, apparatuses, and systems for treatment of a liquid flow comprising addition of a chemical treatment at at least two locations along a side stream of a main flow of said liquid, in which the dosing by such additions is sufficient to treat the entire main flow upon return of the side stream to the main flow. Algorithms are utilized to control the additions at the locations of addition of chemical treatments. In a typical embodiment, one chemical addition is principally proportional to the flow rate of the liquid flow, and the other chemical addition is principally adjusted based on signals from a primary measuring device that measures a parameter in the flow after one or both chemical additions. The addition of chlorine dioxide as the chemical treatment, to disinfect wastewater, is discussed.

16 Claims, 4 Drawing Sheets

METHODS AND SYSTEMS FOR IMPROVED DOSING OF A CHEMICAL TREATMENT, SUCH AS CHLORINE DIOXIDE, INTO A FLUID STREAM, SUCH AS A WASTEWATER STREAM

BACKGROUND OF THE INVENTION

1. Technical Field

The field of invention relates to liquid purification, treatment and separation processes, including controlling process in response to a sensed condition.

2. Description of Related Art

Many fluid handling systems require the monitoring of selected characteristics of the fluid stream in order to determine and control the amount of a treatment chemical to be introduced into the fluid stream. For instance, in wastewater treatment facilities a main stream of wastewater typically is treated with a chlorine-containing compound, often chlorine gas or sodium hypochlorite, to oxidize organic compounds in the fluid stream. Upon exposure to sufficient levels of oxidizing chlorine species for a sufficient period of time, the gross levels of bacteria in the wastewater stream are reduced to allowable levels for discharge from the wastewater treatment plant into an existing stream, river, estuary, etc.

It is undesirable to under-treat the wastewater stream because excessive levels of bacteria will thus remain in the wastewater stream. It is also undesirable to over-treat the wastewater with chlorine because an excessively high residual chlorine level in the wastewater stream can harm the natural flora and fauna at and beyond the outfall (i.e., the end of the pipe of the treatment plant, where the effluent meets the natural body of water). Additionally, when a waste stream is over-treated and is properly detected, an additional chemical, such as sulfur dioxide, typically is added to neutralize the excess chlorine prior to discharge at the outfall. This adds to the cost of the excess chlorine or other treatment chemical, and in sum represents an unnecessary operating cost that can be minimized or avoided by implementation of the present invention.

Many advanced wastewater treatment systems include a residual chlorine analyzer downstream from the chlorinator which monitors the levels of chlorine residual remaining in the wastewater stream. Controllers are known which utilize the results of this downstream analyzer to provide a feedback signal to the chlorinator. In essence, if an amount of residual chlorine is too high at the downstream analyzer, the chlorinator receives a feedback signal which decreases the rate of introduction of chlorine. If the analyzer detects that no chlorine or too little chlorine remains, which indicates that the bacteria level has not been sufficiently lowered, the feedback signal will cause the chlorinator to increase the rate with which it introduces chlorine.

While such residual chlorine analyzers and feedback control systems are generally effective, they suffer from numerous drawbacks. For instance, when the analyzer detects a sub-optimal amount of chlorine residual, additional treatment must still occur to the wastewater stream to properly treat the wastewater. The delay associated with the distance between the analyzer and the chlorinator and the amount of time it takes for the chlorine analyzer to detect any change in chlorine residual causes problems in the control. This can result in uneven, and at times, improper treatment of wastewater. That is, such feedback systems have a tendency to enter into an oscillatory state between over and under chlorination which only relatively slowly resolves itself. This situation is especially common when the requirement, or demand, for chemical treatment within the wastewater stream is fluctuating. In wastewater treatment systems, demand typically is expressed as the sum of the Biological Oxygen Demand ("BOD") and the Chemical Oxygen Demand ("COD") (collectively, "CBOD").

Also, wastewater treatment facilities can incur fines for releasing wastewater which is either under-treated or over-treated with chlorine containing compounds. As noted above, wastewater treatment facilities additionally suffer financially from the unnecessary use of excess chlorine and chlorine-neutralizing chemicals, such as sulfur dioxide, when the chlorination system is not operating optimally.

In past years (and to a much lesser extent currently), dosing was based on results of laboratory or bench testing the influent chemical concentration together with measuring its flow. Subsequently, dose calculations were performed and the dosing device, a chemical feed pump for example, was manually adjusted according to the calculations.

In recent years, reliable automatic analyzers for chemical concentration have become available enabling automation of the entire dosing procedure. Thus, the need for manual testing and manual adjusting has been practically eliminated. An additional consequence is that the automatic analyzers can also be set up to detect several important chemicals in water treatment. This makes the dosing procedure useful for other applications such as the addition of sodium carbonate into an aerated biological reactor to control nitrification or the addition of iron or aluminum salts before a clarifier to control phosphorus removal. However, it has been recognized that problems can occur during the automatic dosing of a chemical into the treatment system because of, inter alia, the inaccuracies of measurement of chemical demand present in the system and the variable ratio of chemical to liquid when the liquid flow rate or the demand is variable.

Japanese Patent No. Sho 51-130055 to Tokyo Shibaura Electric Co. relates to an apparatus for control of the feed rate of water purification reagents. The apparatus consists of a source water quality measurement meter for measurement of water quality of the source water intake, a reagent feed device, a ratio setting device that maintains a ratio of the reagent feed rate to the source water intake, a settling water quality measurement meter that measures the water quality of settling water and outputs a signal, and a calculating control device that receives the output signals and sets the flow rate of the reagent and sets the ratio setting device. The apparatus measures water quality factors such as source water turbidity, pH, alkalinity and temperature, not concentration of the reagents.

U.S. Pat. No. 4,435,291 to Matsko (the '291 reference) discloses a system for controlling the dosing of chlorine in a system for chlorinating wastewater. In the '291 reference, the chlorine dosage is controlled by electronic controllers according to a derivative of residual chlorine with respect to chlorine dosage. This is stated to provide an accurate control of chlorine to insure oxidation of ammonia in wastewater. Flow transmitters sense the flow of chlorine, of base, or of sulfur dioxide to their respective tanks.

U.S. Pat. No. 4,544,489 to Campbell et al (the '489 reference) discloses a process and apparatus for the controlled addition of a conditioning polymer material to sewage sludge. The '489 reference employs a computer with a connected viscometer. Based upon the shear stresses measured and input to the computer by the viscometer, the system controls the rate of pumping of the polymer to mix with the sludge.

Other references that describe aspects of the relevant art are U.S. Pat. No. 5,011,613 to Feray and Hubele, U.S. Pat. No. 5,869,342 to Stannard et al., U.S. Pat. No. 6,129,104 to Ellard et al., and U.S. Pat. No. 6,346,198 to Watson and Armstrong, each of which is hereby incornorated by reference. Also of relevance is "Problems Involving in Automating the Waste-Water-Treatment Plant," by Raymond Kudukis, Ch. 10, pp. 74–78 of INSTRUMENTATION CONTROL AND AUTOMATION FOR WASTE-WATER TREATMENT SYSTEMS, ed. By J. F. Andrews et al. Permagon, N.Y. USA, 1974. This reference states, inter alia, that attaining maximum efficiency of a wastewater treatment plant with automated control systems is expected to remain difficult given the fact that "periodic intensity due to storm flow or periodic lows during dry-weather spells . . . much of the time the flow into the plant is either above or below the maximum efficiency level." Also of relevance is WASTEWATER DISINFECTION—Manual of Practice FD-10, pp. 144–155, Water Environmental Federation, Alexandria, Va. USA 1996, which teaches a number of standard feed control strategies for introduction of disinfectant to wastewater. None of these standard feed control strategies are directed to dual feeding into a side stream to provide dosing for the main flow, such as is disclosed and claimed herein.

None of the references teach or suggest a method for automatic controlled dosing of a treatment chemical into a flow stream in a liquid treatment system that more correctly measures, over small or "real-time" increments, the amount of chemical required based both on varying flow rate and on varying demand for the treatment chemical. Consequently, there remains a need to improve the accuracy and/or the precision of dosing a liquid flow, such as wastewater, with a desired chemical treatment.

SUMMARY OF THE INVENTION

The invention relates to fluid control systems that are configured to control the introduction of at least one treatment chemical, each typically in a liquid solution, into a fluid stream to cause a selected characteristic of the fluid stream to match a desired level. More particularly, this invention relates to the addition of at least one treatment chemical, from at least two distinctly controlled chemical input sources along a treatment stream that is diverted from a primary fluid stream. For example, a fluid solution containing a treatment chemical is added to the treatment stream from two distinctly controlled sources. The addition of treatment chemical from the first source is proportional to the flow rate of the primary fluid stream. This proportionality applies over a wide flow range, and is subject to certain "fail-safe" constraints. The addition of treatment chemical from the second source is adjusted based on results from a measuring probe that measures the level of treatment chemical at a point downstream from the point(s) of introduction of the first and second sources. Embodiments also include the related control systems that add said at least one treatment chemical to the treatment stream via the sources.

Thus, in certain embodiments, the regulation and modulation is effectuated by a first addition point principally set proportional to the main stream flow rate, and a second addition point, principally adjusted based on the extent of a reaction of the chemical treatment with constituents of the liquid in the side stream. Among such embodiments, this extent of reaction is determined by a measurement made at a primary measurement site downstream of the first and second addition points (i.e., sources, or input sites).

Even more particularly, the present invention relates to treatment of wastewater by a disinfectant, chlorine dioxide, which is introduced into two addition points of a side stream, the addition at each point depending upon different algorithms, after which additions the side stream returns to the main stream, bearing sufficient disinfectant to properly treat the constituents (i.e., CBOD) in the main stream of wastewater.

The measuring of the chemical treatment, and the adjusting of the second inflow, can be repeated many times per minute, resulting in semi-continuous or essentially continuous, "real-time" adjustments to the load or other relevant parameter(s) in the liquid stream. By such process, the side stream contains an appropriate amount of chemical treatment to adequately, and more accurately and/or more precisely (depending on the attributes of the wastewater and the disinfectant), treat the entire flow of the main liquid stream.

In practice, a side stream is diverted out of the main fluid flow at a desired point prior to an area of contact and reaction of the main fluid flow, or main fluid stream, with the chemical treatment being added. This side stream has a first side stream addition point (which typically comprises a dispenser and an injector) which injects a varying amount of the chemical treatment, preferably in liquid form, into the side stream. The principal determinant of the amount of chemical treatment added at this first point, during normal flow rate conditions, is the flow rate of the main steam. Then, at a desired distance from this first addition point, a second side stream addition point (which typically comprises a dispenser and an injector) injects a varying amount of the chemical treatment, preferably in liquid form, into the side stream. The principal determinant of the amount of chemical treatment added at this second point, during normal flow rate conditions, is the change in a parameter as measured by a primary measuring device (or analyzer) from a probe or a sample taken at a primary, or first, measuring point.

For instance, where chlorine dioxide is being added to disinfect a wastewater (i.e., sewage) treatment plant main stream after secondary treatment, the primary measuring device measures the concentration of chlorine dioxide, which reflects the decrease in chlorine dioxide as it reacts with oxidizable constituents in the wastewater (i.e., as reflected in CBOD levels). The measuring point is after the first addition, or is after the first and second additions. By repeated adjustments of the first and second addition points' addition levels, the dosage to the main stream is held at or near the dosage actually required based on the main stream's flow rate and CBOD load requiring such treatment.

More generally, the primary measuring device measures the level of the selected characteristic present in the side fluid stream. This typically measures the level of one or more chemicals in the chemical treatment, but alternatively may measure a reaction product or an intermediate in a reaction that is known to take place between at least a component of the chemical treatment and at least one component of the fluid in the side (and main) stream. The result of this analysis is communicated to a controller that controls the level of chemical treatment addition at the second side stream addition point. The point of this first analysis can be in a number of positions relative to the first and second chemical treatment inflows, as discussed, infra. Additionally, other, secondary points of measurement may be added to the system for additional information about the condition of the side or main streams. This additional information may be provided to the controllers for the first and/or second addition points to better refine and adjust the addition levels.

Also, algorithms used in the control aspect of the invention are designed to compensate for changes in the characteristics of the main fluid stream. That is, certain constraints on the basic algorithm are applied to deal with unusual, or non-normal flow conditions. For example, heavy rains in the service area of a wastewater treatment plant typically results in increased total flow to the plant. This flow typically has less biological load per gallon, but may have a higher level of Total Suspended Solids ("TSS"). The algorithm that determines how much chemical treatment is added to the first, principally flow-proportional chemical input point is adjusted to compensate for this deviation in the volume and quality of the main waste stream. Generally, this change will be to lessen the amount of disinfectant added per gallon of flow.

Also, as another example of a constraint-imposing modification of a basic algorithm, when flow falls below a specified rate that corresponds to an established set point, the addition at the second chemical input is modified from its "normal range" algorithm. In such circumstance any addition at the second chemical input is made via such constraint-imposing modification of the general algorithm. Alternatively, or in combination with this modification, when a dramatic drop in flow rate is detected, this also may trigger and result in a modified ratio of treatment at the first addition point. The implementation of these and other "fail-safe" modifications to the algorithms that operate during normal flow conditions depend on the system, the flow characteristics, the legal standards for effluent in effect, and upon other factors.

Based on the above, a primary object of the present invention is to provide a system for adjusting a rate of introduction of chemical treatment fluid into a main fluid stream which causes a selected characteristic of the main fluid stream to match a set point for the selected characteristic, or to stay within a specified range for a selected characteristic.

More particularly, one object of the present invention is to provide methods, systems, and apparatuses for adding chemical treatment via two independently regulated input sources of a chemical treatment into a side stream, in order to provide treatment of the entire main liquid stream that is more attuned to the level of treatment actually needed. The use of the same fluid stream (i.e., wastewater) that is to be treated in the main stream as the fluid medium that is used in the side stream is advantageous in that it allows the assessment of 1) the effect of the wastewater constituents on the concentration (or other attribute) of the chemical treatment at a time and place after its addition to the side stream, and/or 2) the effect of the chemical treatment on water quality parameters of the wastewater itself (such as during its passage in the side stream after introduction of the chemical treatment). This provides distinct advantages over, and is in contrast to, addition methods currently practiced at wastewater treatment plants ("WWTPs") which utilize potable or other water from non-wastestream sources as the medium into which a chemical treatment (such as a chlorine-containing compound) is added prior to mixing with the main waste stream. Among the advantages are: reducing consumption of potable or other water; and providing a means to assess the interaction of the chemical treatment with the actual fluid to be treated in the main flow, so that appropriate adjustments can be made, effectively in "real-time," according to the varying quality of the actual fluid to be treated.

Thus, in preferred embodiments, the invention more precisely controls the amount of treatment fluid to be introduced into a main fluid flow to cause a selected characteristic of the main fluid flow to attain, consistently, a desired outcome for the selected characteristic in the main fluid flow. For instance, where wastewater main fluid flows in a sewage treatment plant are being chemically treated, such as with chlorine dioxide, the use of the present invention system results in more consistent disinfection over time even with a varying range of flow rates and biological and chemical loads. Advantageously, this is achieved with less overdosing and consequently less dechlorination at the end of the system that is common in less robust control systems. Also, this is achieved with less under dosing that can result in the discharge of under-treated wastewater effluent.

Thus, another object of the present invention is to provide a chemical treatment system to treat a fluid flow that minimizes an amount of chemical treatment.

Accordingly, another object of the present invention is to provide a system for treating wastewater that reliably treats the wastewater with chlorine dioxide without over-treating or under-treating the wastewater. A related object is to reduce or eliminate the need to remove excess chlorine dioxide such wastewater at the end of the treatment system.

Another object of the present invention is to provide a chemical treatment system to treat a fluid flow that can operate with a minimum of operator monitoring and intervention.

Another object of the present invention is to provide a chemical treatment system to treat a fluid flow that can display and record data associated with analysis of selected characteristics of the fluid stream for review by an operator.

Another object of the present invention is to provide a wastewater treatment system which utilizes a primary chlorine dioxide analyzer to control a rate of introduction of chlorine dioxide into a wastewater stream.

The foregoing has outlined some of the more pertinent objectives of the present invention. These objectives should be construed to be merely illustrative of some of the more prominent features and applications of the invention. The following detailed description and embodiments are exemplary and explanatory only and are not to be viewed as being restrictive of the present invention, as claimed. These and other objects, features and advantages of the present invention will become apparent after a review of the entire detailed description, the disclosed embodiments, and the appended claims. As will be appreciated by one of ordinary skill in the art, many other beneficial results and applications can be attained by applying modifications known in the art to the invention as disclosed. Such modifications are within the scope of the claims appended hereto.

DESCRIPTION OF THE PREFERRED EMBODIMENTS

Figure 1:
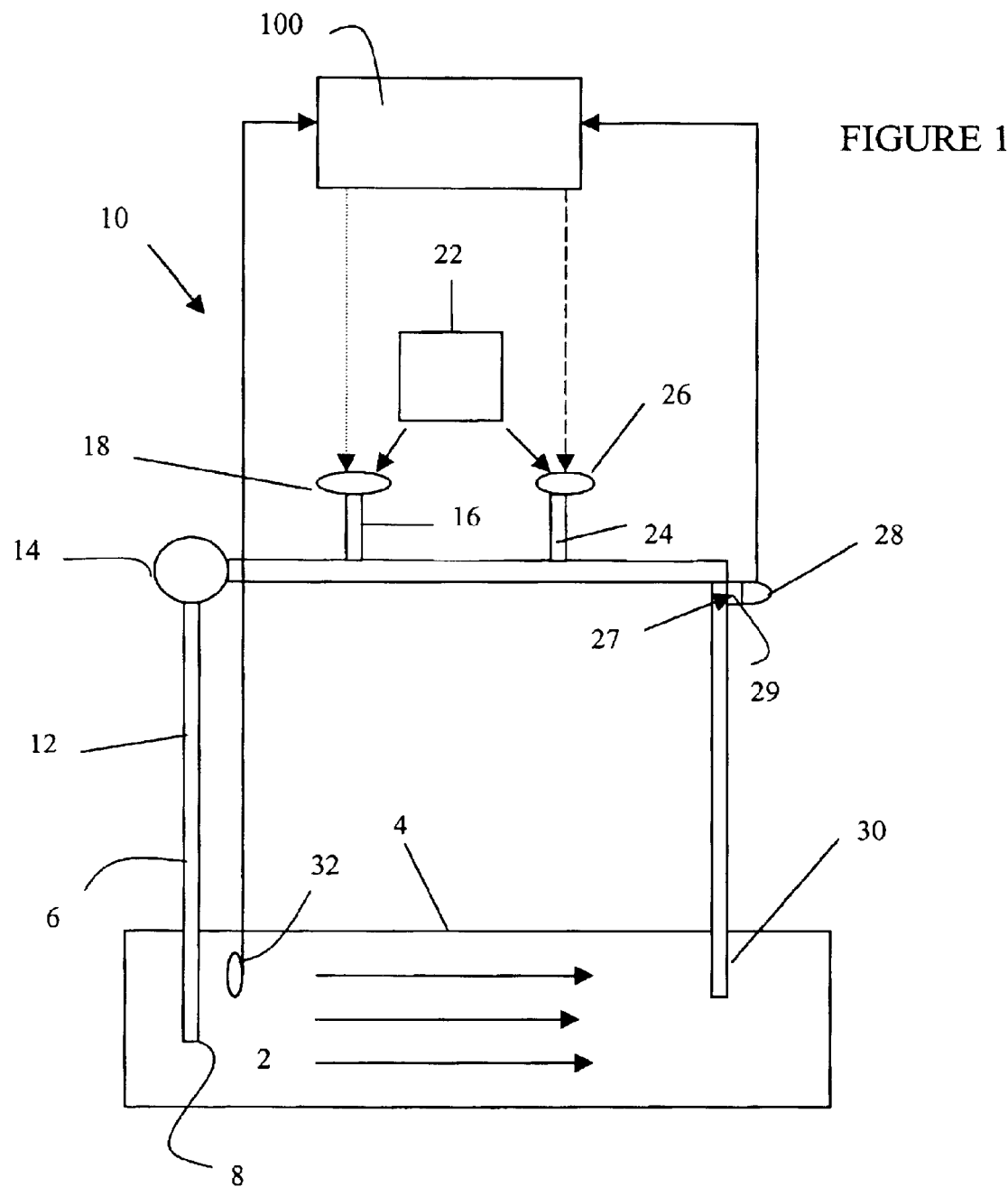
FIG. 1 is a schematic diagram illustrating the major components of the basic system of this invention as they would exist when incorporating the system of this invention into a wastewater treatment system.

As used throughout this specification, including the claims, the term "principally proportional" is meant to indicate that the so-described parameter (e.g., flow rate of the main stream, for the first addition, and change in a measured parameter, for the second addition) is the first in importance among the parameters that are used to determine the rate of addition of a chemical treatment at the respective addition point, under normal flow rate and operating conditions. Similarly, as used herein, the term "principally adjusted" and "principal variable" are meant to indicate that the so-described parameter (e.g., flow rate of the main stream for the first addition, and change in a measured parameter for the second addition) is the first in importance among the parameters (or variables) that are used to adjust (or determine) the rate of addition of a chemical treatment at the respective addition point, under normal flow rate and operating conditions.

"Primary fluid stream" and "main stream" as used herein are meant to indicate the major fluid flow, from which a "treatment," "pilot," or "side" stream is diverted. While not being limiting, the primary fluid stream may be: waste water, as in a municipal waste water treatment plant or facility; process water, as in a chemical or industrial production facility (which may be a particular recycled or re-used process, cooling, heating or other distinct stream, or a collected waste stream bearing particular or varying levels of chemical and/or biological oxygen demand); drinking water (such as from a deep well, a surficial well near a river, lake or other water body, or other source); stormwater (such as prior to release to a natural water body or prior to injection into a designated aquifer); a process liquid flow in need of a reactant or treatment chemical in relation to a component in the flow; or other water designated for use in or replenishment of a body of water or aquifer.

As used throughout this specification, including the claims, the term "computational control device" is meant to include, without being limited to, a dedicated programmed circuit (including, but not limited to, an integrated circuit or a microprocessor) that is capable of sending control signals based on an algorithm that receives data input from one or more sources; a programmable general purpose computational device, such as a computer, that is capable of sending control signals based on an algorithm that receives data input from one or more sources, and a programmable special-purpose computational device, such as a computer, that is capable of sending control signals based on an algorithm that receives data input from one or more sources.

Also, throughout this disclosure and the claims, the use of "first" need not be interpreted to necessarily be upstream of the "second" addition point; such nomenclature is irrespective of relative location. In fact, both addition sources can introduce chemical at essentially the same point along the side stream, although the sources that provide the chemical treatment modify their inputs based on different criteria. Referring to the drawings, wherein like reference numerals represent like parts throughout the various drawing figures, reference numeral 10 is generally directed to a system for treatment of a main flow of a fluid stream, 2, such as wastewater.

Further, in the embodiments depicted in FIGS. 1–4, and discussion thereof, the chemical treatment is chlorine dioxide, and this is being added to disinfect a main flow of wastewater in a municipal sewage treatment plant (a type of WWTP) following secondary treatment. None of the figures are drawn to scale.

FIG. 1 is a diagram that depicts the present invention adding chlorine dioxide to a side stream of a main stream for disinfection purposes. A main flow of a fluid stream, 2, passes in the direction shown by arrows through a main fluid conduit, 4 (whether a sluice, pipe, or other type of structure), after secondary treatment. A side stream of fluid, 6, is pumped from a diverting point, 8, through a minor pipe, 12. A centrifugal pump, 14, powers the flow of the fluid side stream, 6.

The pump, 14, pumps the side stream fluid, 6, past a first addition point, 16, which receives chlorine dioxide solution from a first chlorine dioxide dispenser, 18. This chlorine dioxide is supplied from a chlorine dioxide generator or reservoir, shown in FIG. 1 as 22. The chlorine dioxide so added at the first addition point, 16, mixes with the wastewater of the side stream, 6, at and downstream of the first addition point, 16. Chlorine dioxide also is added at a second addition point, 24, which receives chlorine dioxide solution from a second chlorine dioxide dispenser, 26, which also is supplied from the chlorine dioxide generator or reservoir, 22. Thereafter, a primary chlorine dioxide analyzer, 28, with connected probe, 29, senses the chlorine dioxide level in the side stream fluid, 6, downstream of the second addition point, 24, and supplies the signals providing this data to the controller, 100. The side stream wastewater returns to the main stream at a returning point, 30. Appropriate diffusers may be utilized here to better and more quickly diffuse and distribute the chemically treated side stream wastewater with the main flow, 2, that has remained in the main pipe, 4, between points 8 and 30.

In certain preferred embodiments, each input source of the chlorine dioxide is an inline chlorine dioxide reactor as described in U.S. patent application Ser. No. 10/430,360, entitled "Reactor for Production of Chlorine Dioxide, Methods of Production of Same, and Related Systems and Methods of Using the Reactor." In such embodiments, the rates of pre-cursor chemicals input into the reactor via the supply pipes are what are being modified by a control system. Accordingly, the concentration of the output of each reactor, i.e., chlorine dioxide, is based on an algorithm used by the control system of the present invention for that reactor, and is a result of the modifications of the rates of the input pre-cursor chemical by the control system of the present invention.

In typical embodiments, the levels of chlorine dioxide addition at the first addition point, 16, and at the second addition point, 24, are determined and dispensed over time as follows. A flow meter, 32, positioned in the main pipe, 4, detects the flow rate of the main flow, 2, and transmits signals providing this information to the controller, 100. This flow rate determining may be done periodically, semi-continuously, or continuously.

The controller, 100, inputs the flow rate information so provided into an algorithm for the first addition point, 16. The chlorine dioxide addition at this first point is principally proportional to the flow rate determined by the flow meter, 32.

The chlorine dioxide addition at the second addition point, 24, is principally adjusted based on how much the level of the added chlorine dioxide has diminished from the point(s) of addition to the location of the probe, 29, of the primary chlorine dioxide analyzer, 28. Chlorine dioxide analyzers are widely known and available. Three commercial sources for such analyzers (which alternatively may be referred to as detectors or meters), and the specific probes to detect the chlorine dioxide, are: ATI; Prominent Analyzers; and Aldos Control Technology (Germany). Chlorine dioxide analyzers and probes from these commercial sources are useful in the present invention.

Where the oxidizable chemical and biological demand in the wastewater is relatively high, the standard addition at the first addition point, 16, will have diminished below the lower end of an established range. This will result in the signals from the primary chlorine dioxide analyzer, 28, inputting into the algorithm for the second addition point, 24, and the algorithm directing a certain level of addition of chlorine dioxide at the second addition point, 24. Through repeated feedback signals from the primary chlorine dioxide analyzer, 28, to the controller, 100, the second chlorine dioxide dispenser will adjust to a level that adds sufficient chlorine dioxide to supplement the chlorine dioxide from the principally flow-rate based first addition point, 16. This represents the standard dual measurement feedback adjusted method and system when the flow rate of the main flow, 2, is within normal parameters.

Figure 2:
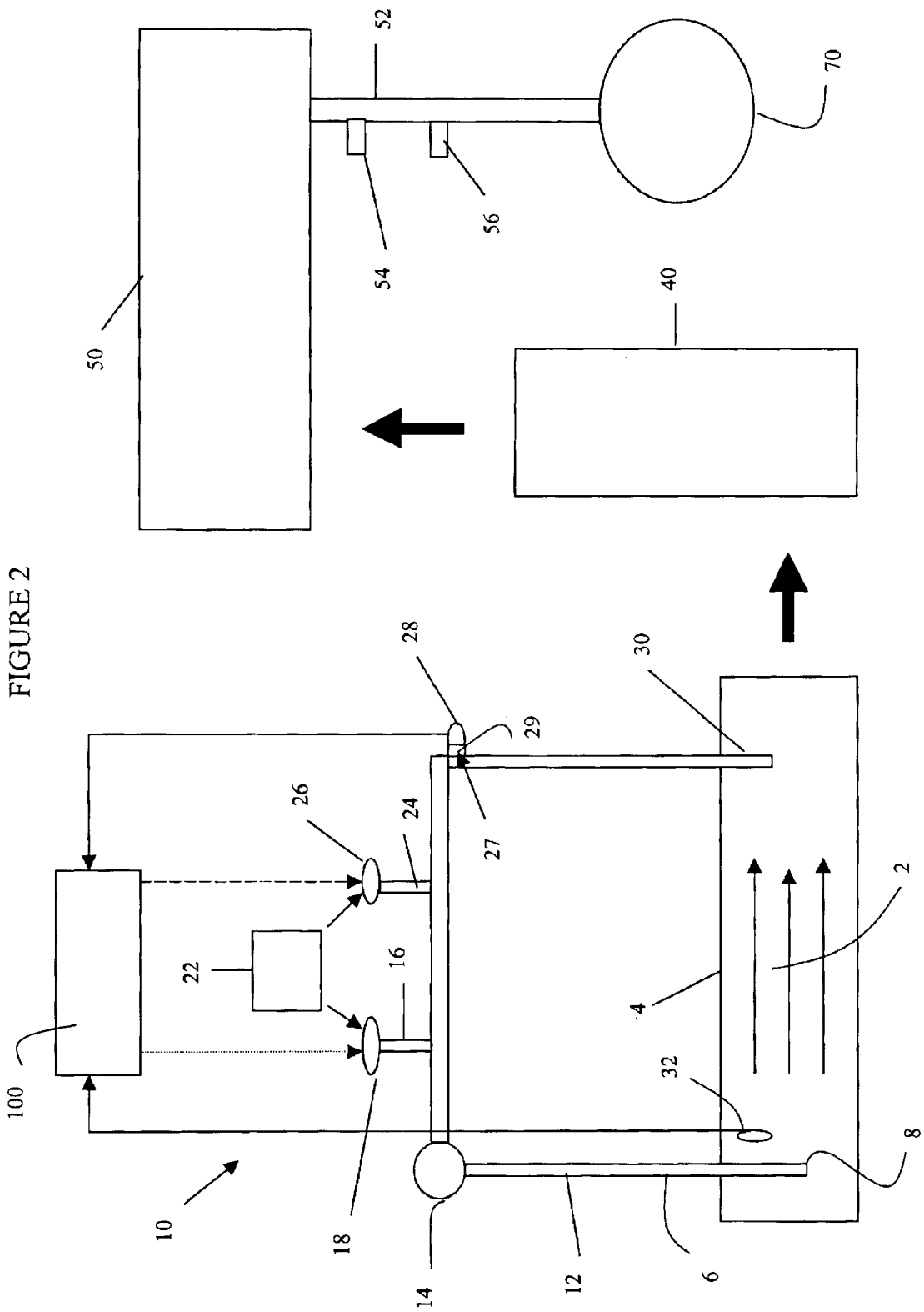
FIG. 2 is a schematic diagram illustrating the system shown in FIG. 1 with additional downstream components of a typical wastewater treatment system, including additional optional measurement sites and signal paths.

FIG. 2 provides a schematic diagram of the aspects of the invention in FIG. 1, in combination with additional components of a wastewater treatment system typically downstream of secondary treatment. After the point in the conduit, 4, at which the side stream returns to the main stream, 30, the main flow, 2, flows to a contact chamber, 40. After a given residence time there (depending on flow rate), the main flow, 2, continues to an aeration basin, 50. At the downstream end of the aeration basin, 50, the flow passes through an exit conduit (a pipe, sluice, channel, etc.), 52, toward the effluent outfall, 70, and thence, typically, into a natural body of water (a stream, river, lake, estuary, ocean, etc.). Along this exit conduit, 52, is a final residual chlorine dioxide meter, 54, positioned upstream of a sulfur dioxide addition point, 56.

Based on the reading of this meter, 54, and the current requirements for maximum chlorine or chlorine dioxide in discharge water, sulfur dioxide may be added to the wastestream at sulfur dioxide addition point, 56. Optionally, the readings from this meter, 54, may also be provided to the controller, 100 (line passing signals is not shown in FIG. 3). This can help refine the dosing, as discussed for secondary analyzers, below. It is noted that the provision of a sulfur dioxide or similar end-of-line system to remove chlorine or chlorine dioxide from a system using the present invention is considered a back-up, or "fail-safe" feature. Using the present invention, which adjusts the dosing of chemical treatment to real-time requirements of the main flow fluid's characteristics, the requirement for end-of-line system to remove excess chlorine or chlorine dioxide is greatly reduced or eliminated.

Figure 3:
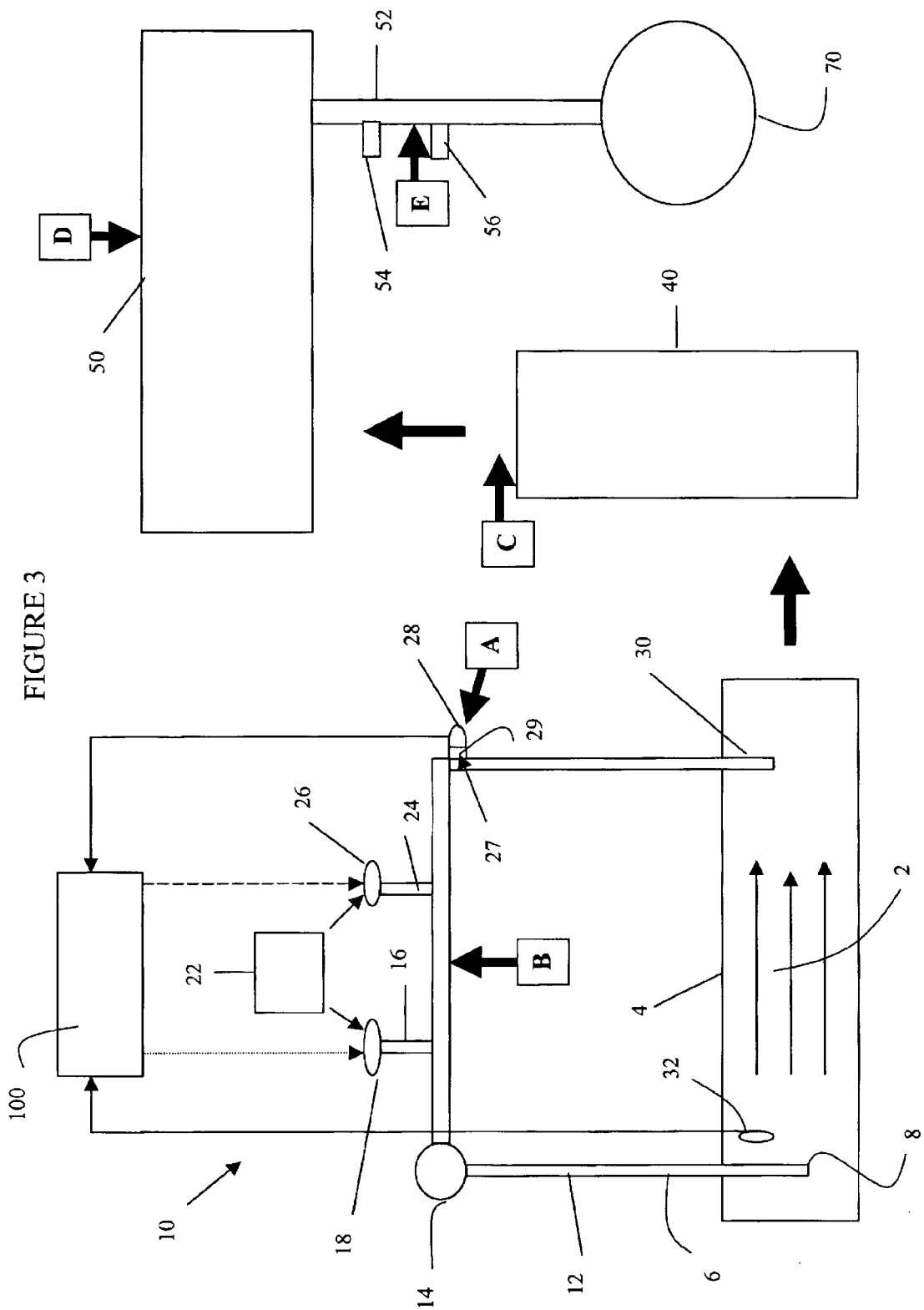
FIG. 3 is a schematic diagram similar to FIG. 2, showing alternative sites for the primary measurement point.

In general, secondary detection analyzers (i.e., an additional chlorine dioxide meter when chlorine dioxide is used, or other types of analyzers, where chlorine dioxide is not used), with probes or sampling ports, can optionally be provided further downstream, in the side stream, 6, and/or in the main stream, 2, after the returning point, 30. FIG. 3 provides a schematic diagram similar to FIG. 2, showing preferred points for the primary analyzer and for secondary analyzers.

One preferred, simple approach to monitoring is to have a single, primary analyzer at position A in FIG. 3. This is after both the first and the second chemical treatment addition points along the side stream. Another preferred approach is to have a primary analyzer at position A, and to have a second (but also primary) analyzer at position B, between the first and the second chemical treatment addition points. Another simple approach to monitoring is to have a single, primary analyzer at position B in FIG. 3. This is between the first and the second chemical treatment addition points along the side stream.

Any of these configurations of side stream analyzers can be combined with one or more secondary analyzer downstream, such as at points C, D or E. Such one or more secondary analyzers can provide data signals that help assess, for instance, the daytime rate of breakdown of a photo reactive oxidant, such as chlorine dioxide, due to the ultraviolet light from sunlight. This data can help refine the dosing to compensate for this. More generally, data from such secondary sources of data may be used to supplement the primary measurements taken at the primary measuring point, to better refine the dosing.

Generally, the primary analyzer is spaced in the side stream line after sufficient residence, or contact time, has transpired between the chlorine dioxide (or other chemical treatment) and the wastewater. When chlorine dioxide has been used in pilot scale wastewater treatment systems, it has been observed that a distance of as little as four feet along the side stream is a sufficient space between the second chemical treatment addition point and the primary analyzer. This is when flow is about 60 gallons per minute. Utilizing chlorine dioxide analysis techniques, the wastewater is then monitored to measure the amount of chlorine dioxide remaining in the wastewater. This is done either with a probe in the side stream, or using a diverted sample bypass line to the analyzer. For some analyzers, a buffer solution is added to the sample bypass line and then a sample cell measures the appropriately buffered wastewater sample.

The secondary analyzers may take a form similar to that of the primary analyzer. Optionally, samples from one or more secondary analyzers could be appropriately directed to and integrated with the primary analyzer so that that single sample analyzer could be used. In such configuration a single analyzer receives all samples, coming either from the side stream and/or the main stream. Such data can be used in the algorithms that control the first and second chemical addition points to better refine the accuracy and/or precision of the additions, such as due to weather conditions that affect the reaction, etc. This approach, although more demanding as far as sample transport to the single analyzer, virtually eliminates error due to variation of readings due to differences (in calibration, probes, etc.) in several analyzers. In general, the use of additional, secondary analyzers can contribute to the ongoing attainment of optimal performance under a variety of ambient conditions.

Figure 4:
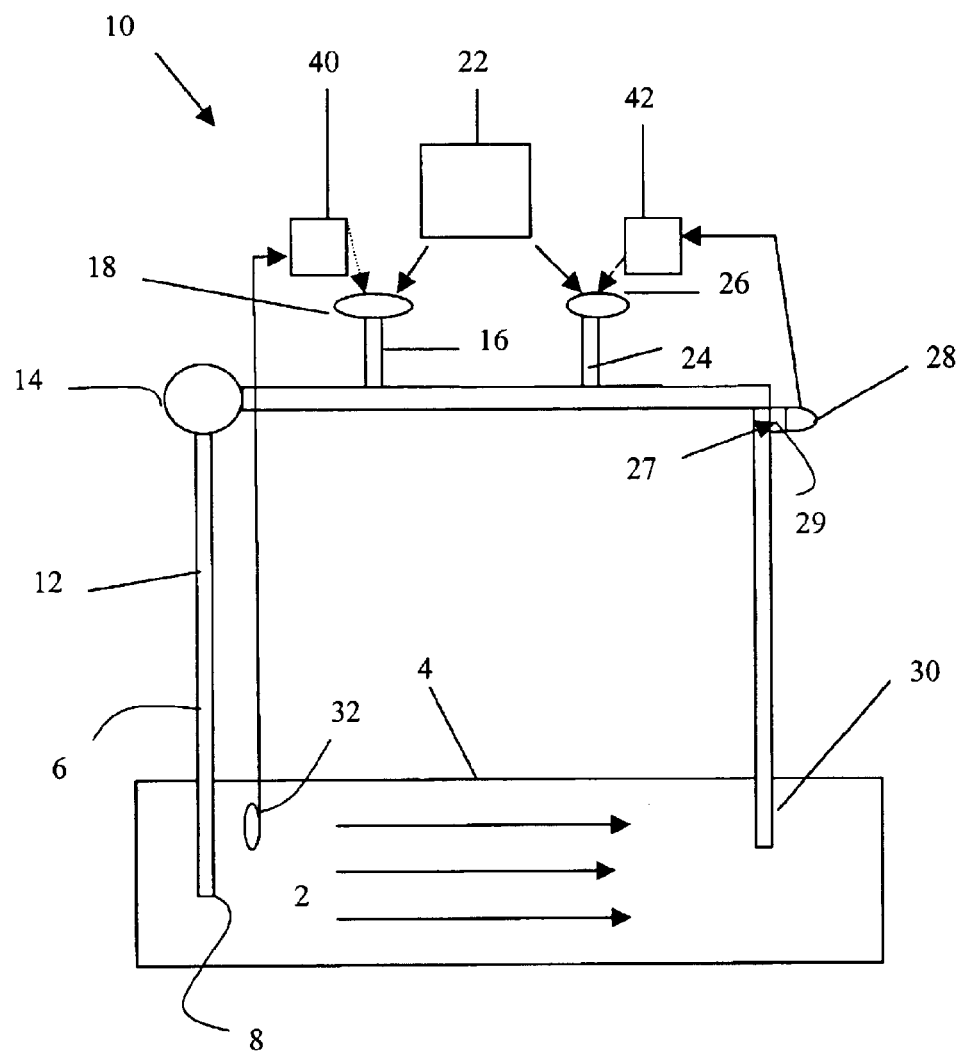
FIG. 4 is a schematic diagram of a specific embodiment of the invention using injectors to add the chemical treatment, in which each injector is controlled by a separate control device.

In another embodiment, shown in FIG. 4, there is a separate control device for each chemical treatment source rather than the single controller as shown and described in FIGS. 1–3.

As for the previously described figures, in FIG. 4 a main flow of a fluid wastestream, 2, is treated in a controlled fashion according to the system, 10, of this invention. A side stream, 6, is diverted from the main flow of fluid waste stream, 2, at diverting point, 8. At a first addition point, 16, at which is positioned Injector 1, a precisely measured amount of chlorine dioxide is added into the side stream, 6. This is added from a chlorine dioxide generator or reservoir, 22, and the addition is regulated by a first chlorine dioxide dispenser, 18, which dispenses chlorine dioxide into side stream 6 through Injector 1 (positioned at 16). The addition at Injector 1, as controlled by the first chlorine dioxide dispenser, 18, is based on a first algorithm that is principally proportional to the flow rate of the main flow 2, as measured near point 8, by flow meter 32. The data signals from the flow meter, 32, travel to a dedicated first addition point control device, 40. This may be any controller as defined, supra, or a dedicated integrated control circuit, or any equivalent known to those skilled in the relevant arts.

A second chlorine dioxide dispenser, 26, dispenses chlorine dioxide into side stream 6 through Injector 2, which is positioned at a second addition point, 24. The addition at Injector 2, as controlled by the second chlorine dioxide dispenser, 26, is based on an algorithm that is principally adjusted based on the measured decrease in the level of chlorine dioxide, as measured by a chlorine dioxide meter, 28 (e.g., the primary analyzer.). The chlorine dioxide meter, 28, has a probe, 29, positioned in the side stream, 6, after the first addition point, 16, and after the second addition point, 26. The data signals from the chlorine dioxide meter, 28, travel to a dedicated second addition point control device, 42. This may be any controller as defined, supra, or a dedicated integrated control circuit, or any equivalent known to those skilled in the relevant arts.

In one basic embodiment, the signals indicating the levels of chlorine dioxide by the primary analyzer, the chlorine dioxide meter at 28, are transmitted, such as by electrical signals along a conductive wire, to the second chlorine dioxide dispenser, 26. These signals, transmitting the chlorine dioxide levels measured at location 26, are used to adjust the level of addition at Injector 2, which is controlled by the second chlorine dioxide dispenser, 26. The measurements are taken semi-continuously at desired periods, or are measured continuously. Adjustments are made according to a second algorithm that, in preferred embodiments, is customized to the particular facility and purposes of the treatment.

Thus, for the embodiment depicted in FIG. 4, there is no single controller that receives data signal inputs and controls both the first and the second additions of chemical treatment. Instead, a dedicated individual control circuit, such as may be integral with an automated chemical dispenser, or any type of controller (i.e., using a computation control device) as described, supra, controls each discrete addition point. As to a dedicated individual control circuit, the characteristics of such control circuits are known to those skilled in the art, and the discussion in this disclosure of features of a single controller may also be applied to a dedicated control circuit for a discrete chemical treatment addition point.

A number of algorithms can be utilized in the present invention to achieve maintenance of a desired level of addition of a chemical treatment under varying conditions of composition of the primary fluid stream. A two-equation algorithm is provided below which is for use in the present invention to provide dosing rates for two pumps. A first pump (or chemical treatment source), P1, is flow-proportional and set to a proportion of the total desired nominal additional level of a chemical treatment, such as chlorine dioxide. The percentage of the total addition that is provided by this first pump preferably takes into consideration site- and facility-specific factors. For instance, where the flow of a WWTP is being chemically treated after secondary treatment, when the flow is consistent, largely from households, and not subject to large fluctuations in the sum of the BOD and COD, then the percentage of total addition provided by the first, flow-proportional pump is relatively large, typically 70 to 90 percent.

The basic equation for this first pump is:

P1DR=(a)ODR, where:
    P1DR=pump 1 dose rate;
    a is the nominal (i.e., initial, or calculated) fraction of the total dose of treatment given by pumps 1 and 2 at pump 1; and
    ODR is the optimum dose rate, as determined by initial testing of the characteristics of a particular primary fluid stream (such as a wastewater stream).

The algorithm for a second pump (or chemical treatment source) being adjusted based on measurement results of a downstream monitoring device, is as follows:

P2DR=(b)ODR+(P1DR−X)(F), where:
    as above, P1DR=pump 1 dose rate and ODR is the optimum dose rate, as determined by initial testing of the characteristics of a particular primary fluid stream (such as a wastewater stream);
    b is the nominal (i.e., initial, or calculated) fraction of the total dose of treatment given by pumps 1 and 2 at pump 2, where a+b=1.0 (i.e., the total of the Optimum Dose Rate, ODR);
    X=time-averaged result from downstream monitoring device (here, particularly, for $ClO_2$);
    P2DR=pump 2 dose rate; and
    F=a factor to adjust for desired responsiveness of the system to time-based changes in the flow, to demand in the liquid being treated that is not accounted for by the short retention time prior to the site of the sample point of the downstream monitoring device provides data signals to obtain the value, X, and other factors that may be determined to be of importance (for instance, but not to be limiting, the desired "overdosing" that may be acceptable in a given treatment situation).

First, without considering the percentage of the total flow of the main stream that flows in the side stream, it is observed that the above equations operate to alter the P2DR based on the reading X of the chemical parameter at a downstream monitoring point. For example, when chlorine dioxide is treating a wastewater stream, and at a particular point in time this wastewater stream has high combined BOD and COD, an upward change from the nominal or initial dosing may result as follows:

Rates before influx of high combined BOD and COD waste water are:
    P1DR=(a)ODR, P1DR=(0.8)(2.0 ppm)=1.6 ppm distributed at pump 1.
    P2DR=(b)ODR+(P1DR−X)(F), P2DR=(0.2)(2.0 ppm)=0.4 ppm initial rate; then, for period before noted influx, assume P1DR=X, so this 0.4 ppm rate does not change.

Rates immediately after influx of high combined BOD and COD wastewater are:
    P1DR=(a)ODR, P1DR=(0.8)(2.0 ppm)=1.6 ppm distributed at pump 1. This rate does not change at the present.
    P2DR=(b)ODR+(P1DR−X)(F), P2DR=(0.2)(2.0 ppm)+(0.8−0.6)(F)=0.4+(0.2)(F), and where F=1.5 to account for time-adjusted demand (given the location of the monitoring device in relation to downstream additional demand), then P2DR will be adjusted upward to: 0.4+(0.2)(1.5)=0.7 ppm addition rate at P2. That is, due to the CBOD load in the liquid being treated, which resulted in a sufficient decrease detected at the downstream monitoring point, the algorithm provides for an additional amount of chemical via the second input.

With readings taken many multiple times per minute and adjustments made multiple times per minute, the large incremental increase provided in this example is likely not to take place. Rather, in practice, with a computer controlling the changes over small time increments, much smaller incremental changes are made over short time periods. Thus, this example is meant to show the gross effect of changes in the quality of the liquid in the flow stream, and how this algorithm compensates for such changes.

Looking at the other end of this hypothetical "plug" of high combined BOD and COD waste water, at a certain point the flow will return to a more normal CBOD profile. As this is occurring, one of the iterations for calculating and altering P2DR is exemplified as follows, based on a time-averaged X value of 0.75 ppm at the downstream monitoring site:

P2DR=(b)ODR+(P1DR−X)(F), P2DR=(0.2)(2.0 ppm)+ (0.8−0.75)(F)=0.4+(0.05) (F), and where F=1.5, P2DR=0.4+(0.075)=0.475 ppm addition rate. Thus, iteratively, as the wastewater returns to a normal level of BOD and COD, the P2DR will return to its nominal level.

Further, in certain embodiments, as a standard convention of the basic algorithm, if the second part of the P2DR equation, namely "(P1DR−X)(F)" calculates for one or a designated number of time intervals to be below zero, then P1DR itself is lowered. For example, if a time-averaged X value at the downstream monitoring site is 0.87 (when, for example, P2DR is providing 0.2(ODR)), and P1DR=0.8, then (P1DR−X)(F) is less than zero. Accordingly, upon one or more such sequential results, P1DR is decreased incrementally until (P1DR−X)(F) is greater than zero.

Also, when implementing the above algorithm for typical systems, a dilution factor, DF, is incorporated into the process control system programming. DF is derived from the ratio of the flow in the main stream (at a point before or after the diversion of a portion of this stream for the treatment, or side, stream) to the flow of the treatment, or side stream:

DF=flow in main stream/flow in treatment (side) stream, where the units of flow are the same and cancel out to provide a simple numerical ratio.

An example is illustrative of the coordinated use of the above equations, as would occur in a software program developed to automate the control of addition of a treatment chemical into a stream of liquid to be treated. Assume that the desired or required dosing rate (designated as Target Final Concentration, or TFC) to be achieved in the main stream is 1.2 ppm of $ClO_2$ measured at a downstream point Z (where Z is more downstream than the measuring meter that provides X). Assume also that the DF is 400. Thus, the ODR to be delivered by pumps 1 and 2 is:

ODR=(TFC)(DF)=(1.2 mg $ClO_2$/L of total flow)(400 Liters total flow/Liter side stream flow)=480 mg $ClO_2$/ Liter side stream flow.

Thus, a total of 480 mg $ClO_2$ is to be added by both pumps for each 400 liters that pass through the main flow, which, at the DF of 400, is added to one liter of side stream flow. This is added either on a time-based or flow rate-based addition program to the side stream flow.

Then, based on a review of the historical flow and chemical parameters of the facility (or of similar facilities); a decision is made as to how to initially proportion the total addition of treatment chemical between pumps 1 and 2. For instance, where the liquid stream to be treated is fairly uniform over time in its concentration of the constituents to be treated (i.e., the sum of the biological and chemical oxygen demands), a greater proportion of the total treatment addition can be added by the "first," flow-proportional pump. That is, this pump would be set by the first equation above to be flow-proportional. In this example, it is assumed that the liquid to be treated is moderately consistent in its constituents to be treated and there are no periodic inputs of interfering compounds. Therefore, the flow-proportional pump is operated at a relatively high percentage of the ODR, 0.8:

P1DR=(a)ODR=(0.8)(480 ppm)=384 ppm.

Thus, the first pump is operated to deliver 384 'milligrams of chlorine dioxide to one liter of side stream water. At the DF of 400, this corresponds to 80 percent of the ODR for 400 liters of main flow water. This 384 milligram dose is dispensed in the same time unit in which 400 liters of main flow water flow past a given point. As noted above, this is added either on a time-based or flow rate-based addition program to the side stream flow.

As to the latter point, it is noted that in certain embodiments the side stream pump system is set to be flow-proportional to the main flow. This requires a variable flow pump and a controller. In such embodiments the addition rate to the side stream can be "flow-rate-based." That is, each source's net addition to the side stream is made proportional to the side stream flow rate, which itself is proportional to the main stream flow rate.

Alternately, in other embodiments a single speed pump can pump water through the side stream system. In such embodiments, the pump may be positive displacement, centrifugal, or other common types. For instance, a 60 gallons per minute (nominal) flow rate centrifugal pump has been used to pump a side stream in several systems using the present invention. When a pump is not positive displacement, depending on the design of the system, the head pressure of the main flow can affect the actual flow through the side stream. In systems in which the present invention has been used, this variation in actual flow rate has not been determined to adversely affect the overall dosing efficacy of the present invention. In certain systems with large relative differences in head in the main stream, and relatively large vertical heights to pump the side stream water, such variable main stream head differences may more significantly affect the dosing effectiveness. In such instances, various corrections may be made, or a positive displacement pump may be utilized.

Alternatively, where a non-positive displacement pump is used and the head difference errors are considered to not warrant corrections, the chemical input rate into the side stream can be "time-based." For instance, in embodiments where flow is not proportional, and is not constant (such as it would be with a positive displacement pump), the dosing of chemical treatment into the side stream is made to correspond to the time unit in which a given amount of main flow liquid passes a given point in the main flow system. Thus, the addition is not based on the rate of flow in the side stream, but the rate of flow in the main stream, so the addition is based on the time it takes for x liters to pass a point in the main stream. This is programmed into a computational control device that receives data inputs that indicate the main stream flow rate. This approach reduces errors that may result from adding to the side stream based on a per unit liquid in the side stream.

In one example, not to be limiting, the controller, 100, in FIG. 1 preferably is in the form of at least one application specific integrated circuit which is configured using known techniques to receive the various different inputs identified above and to make adjustments to the system 10 to achieve results desired by an operator. The controller 100 preferably additionally includes a display (not shown) and also an output system (not shown) for printing onto paper or other media a hard copy for recording data indicative of the overall performance of the various different portions of the system 10. It is noted that for this and other embodiments, the signals from the detectors or from other sensors may be communicated by any way known to those of skill in the art. That is, the signals can be communicated by conventional means, such as by sending electrical impulses along a conducting wire, by more sophisticated means, such as by converting the signals into radio waves and transmitting these waves such that a receiver receives the signals and thereafter sends them to the integrated circuit, microprocessor, special-purpose computer, or general purpose computer (all of which are represented in FIG. 1 as controller 100), or by any other way now known or later developed. Likewise, each individual control circuit, such as for a single chemical treatment feed pump, may be of such types as discussed herein.

The controller 100 receives as input the chlorine dioxide detected by the analyzer 28 taking measurements at first measuring point 27 via probe 29. The controller 100 also receives data input from the flow meter, 32, in the main stream (and from the pump or flow meter, not shown, indicating rate in the side stream, where implemented) and receives and controls the rate of chlorine dioxide addition by first chlorine dioxide dispenser 18 and second chlorine dioxide dispenser 26. Where such component is part of the system being controlled, the rate of $SO_2$ injection from the $SO_2$ injection subsystem (not shown) also is controlled by controller 100.

The controller 100 additionally includes a set point, typically input by the operator, indicating the desired level of chlorine dioxide at one or more downstream points. Each set point can either be a single point or can be configured as an acceptable range or a tolerance level above and below the single set point. Further, the controller 100 can be programmed by the operator to control what information is represented on a standard data output display (not shown, but, for instance, a video screen) and what information is recorded and outputted by data recorder/printer outputs (not shown) provided by the controller 100. Other settings and initial settings for the first chlorine dioxide dispenser 18 and second chlorine dioxide dispenser 26, and the $SO_2$ injection subsystem (when it exists and is being controlled by the controller 100) can be provided by the operator. Finally, the controller 100 may receive an optional verification signal from a verification analyzer (not shown) that periodically provides a check of the accuracy and precision of the analyzer, 28.

The controller 100 has appropriate logic provided by the application specific integrated circuit, or other logic devices, such as software operating within a personal computer or other programmable computing device, which act on the inputs provided by the operator and the signals received from the various different inputs, as indicated in FIG. 1, to generate various different output signals. First, the controller 100 provides a first chlorine dioxide signal 40 which is coupled to the chlorine dioxide pump 18 to cause the chlorine dioxide pump 18 to provide an addition in accordance with the desired algorithm in use. Second, the controller 100 provides a second chlorine dioxide signal 42 which is coupled to the chlorine dioxide pump 26 to cause the chlorine dioxide pump 26 to provide an addition in accordance with the desired algorithm in use. These control signals, as described herein, fluctuate based on inputs from, for instance, the main flow flow meter, 32, and the chlorine dioxide detected by meter 28. Optionally, where such is part of the system being controlled, the controller 100 produces an $SO_2$ output side control signal which adjusts a rate at which a $SO_2$ pump delivers $SO_2$ at the end of chlorine dioxide contact region to remove undesired remaining chlorine dioxide levels. As indicated above, the latter is a "fail-safe" system that is expected to be required minimally, or not at all, when using the present invention in manners as described above.

Thus, in simple control systems of the present invention, a dedicated control circuit may be pre-programmed and fixed with a specific algorithm. However, in preferred embodiments, the control system can provide for an override to allow manual control, the capability to switch from one algorithm to another, as may be desired by an operator, and the capability to modify set point ranges within a given algorithm or program.

The above discussion, having described specific embodiments of the present invention, is indicative of embodiments of the methods of the present invention. More particularly, and referring to FIG. 1, a basic method of the present invention, to control the level of addition of a chemical treatment to a main flow of a fluid wastestream, comprises:

a. diverting a side stream, 6, from said main flow, 2, at a diverting point, 8;

b. determining the flow rate of said main flow (such as, but not limited to, having a flow meter, 32, in the main flow, 2, near diverting point 8);

c. adding said chemical treatment at a first addition point, 16, of said side stream, 6, at a level of addition based principally on proportionality to said wastestream's main flow flow rate;

d. measuring, at a first measuring point, 27, downstream from said first addition point, 16, the concentration of said chemical treatment in said side stream;

e. adding said chemical treatment at a second addition point, 24, of said side stream, 6, at a level of addition based principally on the difference between the level of addition at the first addition point, 16, and the concentration measured in step 'd;' and f. returning said side stream, 6, to said main flow, 2, of said wastestream downstream of said diverting point, 8;

whereby the chemical treatments so added are sufficient to treat the entire flow of the wastestream with a desired level of chemical treatment additions to achieve the particular purpose for the chemical addition.

This control approach works well with the addition of chlorine dioxide to disinfect wastewater treatment effluent. In treatment of other liquid streams, where even closer tolerances are needed for the addition of the chemical treatment to the composition of the liquid stream, one or more of the following strategies and/or modifications are useful to implement even greater accuracy of delivery of a chemical to treat a liquid flow according to the present invention.

In alternate embodiments, instead of measuring the concentration of the chemical treatment added to said side stream, a parameter of the fluid stream, whether a reactant, intermediate, byproduct, or end product of a reaction with a component of the chemical treatment, is measured. Also, ozone or other disinfecting agents, such as chlorine gas or sodium hypochlorite, may be used as the chemical treatment instead of the above disclosed chorine dioxide. Alternately, the chemical addition into the side stream may be in a gaseous state, a liquid state, or a solid (i.e., powdered) state.

At a broader perspective, although the methods and systems of the present invention have been described in detail for embodiments in the context of a wastewater treatment system, the present invention is also applicable to other fluid stream treatment systems. In all such embodiments, a chemical treatment is added to a portion of the main fluid stream that has been diverted to a side stream, wherein such chemical treatment is added at at least two addition points (one addition principally flow-rate-based, a second addition principally proportional to a measured change in the amount of the chemical treatment after a given time period in contact with the side stream after the first and/or second addition(s)), at least one measurement point is downstream of at least one addition point, the measurement at this measurement point is used to principally determine the above-noted second addition, and the thus-treated side stream, when returned to the main stream of the fluid stream, provides the desired treatment.

Thus, it is within the scope of the present invention that there are more than two addition points, with additional addition points placed either in the side stream or the main stream, so long as the two side stream addition points operate as described herein. Likewise, it is within the scope of the present invention that the sequence of placement of the two side stream addition points need not be as sequenced above, e.g., the main-flow rate proportioned addition point upstream of the primary analyzer-based addition.

Also, it is recognized that the algorithms often are customized to the particular site. Also, data from ambient conditions, such as temperature, wind speed and direction, and sunlight irradiation, and time of day may be input into the controller and may be factors in the algorithms that direct the chemical addition. More generally, algorithms may be modified based upon the season.

Further, in other embodiments the chemical treatment, the composition of the main flow, the parameters measured, and the exact addition and measurement sites vary according to the system requirements and relevant parameters. For instance, the present invention may be used to treat water for potable use or for other uses, and for various liquid flows in an industrial process treatment. Hence, this detailed description, including the examples that follow, are not be construed as limiting this invention to wastewater treatment systems.

EXAMPLE 1 the following table of data exemplifies how the present invention, using the algorithms described above, operates to refine chlorine dioxide dosing in a wastewater treatment plant. The side stream flow is one percent of the main stream, and the ODR has been determined to be 1.4 ppm in the main stream (i.e., 140 ppm in side stream) The split between the first (flow-proportional) and second (variable) dosage points is 0.75 and 0.25. The F factor is set to 1.35.

| TIME | STATUS | MAIN STREAM FLOW RATE (MGD) | $1^{ST}$ DOSAGE P1DR | $2^{ND}$ DOSAGE P2DR | $1^y$ MSG POINT READING "X" | Comments/Actions: |
|---|---|---|---|---|---|---|
| 1200 | Normal | 20 | 105 | 35 | 98 | Add 9.45 ppm to P2DR base. |
| 1201 | Normal | 20 | 105 | 44.45 | 104 | Add 1.35 ppm to P2DR base. |
| 1202 | Normal | 20 | 105 | 36.35 | 102 | Add 4.05 ppm to P2DR base. |
| 1210 | Normal | 20 | 105 | 39.05 | 106 | Do not adjust base rate P2DR. |
| 1211 | Normal | 20 | 105 | 35.00 | 102 | Add 4.05 ppm to P2DR base. |
| 1212 | Normal | 20 | 105 | 39.05 | 104 | Add 1.35 ppm to P2DR base. |
| 1213 | Normal | 20 | 105 | 36.35 | 103 | Add 2.70 ppm to P2DR base. |
| 1400 | Stormwater starts | 21 | 105 | 37.70 | 100 | Add 6.75 ppm to P2DR base. |
| 1401 | Stormwater starts |  | 105 | 41.75 | 103 | Add 2.70 ppm to P2DR base. |
| 1410 | Stormwater increasing | 23 | 105 | 36.35 | 108 | Do not adjust base rate P2DR. |
| 1411 | Stormwater increasing | 23 | 105 | 35.00 | 115 | Decrease P1DR. |
| 1412 | Stormwater increasing | 23.5 | 100 | 35.00 | 108 | Continue to decrease P1DR. |
| 1413 | Stormwater increasing | 24.0 | 95 | 35.00 | 105 | Continue to decrease P1DR. |
| 1413 | Stormwater increasing | 24.0 | 90 | 35.00 | 90 | Make no change to P1DR or P2DR. |
| 1414 | Stormwater increasing | 24.0 | 90 | 35.00 | 90 | Make no change to P1DR or P2DR. |
| 1430 | Stormwater peaking | 30 | 95 | 35.00 | 98 | Make no change to P1DR or P2DR. |
| 1600 | Stormwater ends | 22 | 105 | 35.00 | 102 | Add 4.05 ppm to P2DR base. |
| 0400 | Outage Main break | 14 and decreasing | 105 | 35.00 |  | Main flow fell below lower set point. Alarm signals out of range condition. Addition to P1DR and/or P2DR decrease. |

Thus, as exemplified above, using the algorithms explained above serves to maintain a desired level of combined chemical addition from the first and second addition points to the side stream. This dosing system operates under a range of conditions of the wastewater and the wastewater treatment plant.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method to control the level of addition of a chemical treatment to a main flow of a fluid wastestream being treated thereby, for a particular purpose, comprising:
    a. forming a side stream from said main flow at a diverting point;
    b. determining the flow rate of said main flow;
    c. adding said chemical treatment at a first addition point of said side stream, at a level of addition based principally on proportionality to said wastestream's main flow flow rate;

d. measuring, at a first measuring point downstream from said first addition point, the concentration of said chemical treatment in said side stream;

e. adding said chemical treatment at a second addition point of said side stream, at a level of addition based principally on the difference between the level of addition at said first addition point and the concentration measured in step 'd;' and f. returning said side stream to said main flow of said wastestream downstream of said diverting point;

whereby said wastestream thereby is provided with a desired level of chemical treatment additions to achieve said particular purpose.

2. The method of claim 1, wherein said chemical treatment comprises chlorine dioxide.

3. The method of claim 1, wherein said measuring is conducted between said first addition point and said second addition point.

4. The method of claim 1, wherein said measuring is conducted downstream of said first addition point and said second addition point.

5. The method of claim 1, wherein said adding at said first point is determined by an algorithm that has, as its principal variable, a parameter change indicative of the flow rate of said main stream.

6. The method of claim 1, wherein said adding at said second point is determined by an algorithm that has, as its principal variable, a parameter change indicative of reaction of said chemical treatment with one or more components in said side stream.

7. The method of claim 1, additionally comprising sending data signals of said measuring, step d, to a computational control device, and sending control signals from said computational control device to a second addition point control device that controls the rate of said adding of said chemical treatment at said second addition point.

8. The method of claim 7, additionally comprising sending data signals of said determining, step b, to said computational control device, and sending control signals from said computational control device to a first addition point control device that controls the rate of said adding of said chemical treatment at said first addition point.

9. The method of claim 1, additionally comprising sending data signals of said determining, step b, to a computational control device, and sending control signals from said computational control device to a first addition point control device that controls the rate of said adding of said chemical treatment at said first addition point.

10. The method of claim 9, additionally comprising sending data signals of said measuring, step d, to said computational control device, and sending control signals from said computational control device to said second addition point control device that controls the rate of said adding of said chemical treatment at said second addition point.

11. A system for dosing a main flow of a liquid in need of chlorine dioxide treatment with chlorine dioxide, comprising:

a. a side stream diverting from said main flow of said liquid, comprising:

1. a diverting point that provides an intake for liquid into said side stream from said main flow;

2. a first addition point at which a first addition of chlorine dioxide is added to said side stream, said first addition principally proportional to the flow rate of said main flow;

3. a second point at which a second addition of chlorine dioxide is added to said side stream, said second addition principally adjusted based on data signals from a primary measuring device, wherein said device measures a parameter in said liquid indicative of a reaction between said chlorine dioxide and component(s) in said liquid; and 4. a returning point positioned downstream of said diverting point, through which liquid in said side stream returns to said main stream;

b. said primary measurement analyzer, positioned downstream of said first addition point, and providing data of said measurement of said change, said data being used to set said second addition; and c. at least one computational control device, receiving signals indicating said flow rate of the main stream and using said signals to control the first addition according to a first algorithm, and receiving data from said primary measurement analyzer, and using said data to adjust the second addition according to a second algorithm, wherein said side stream controller provides sufficient chlorine dioxide addition to achieve a desired purpose in the fluid in the main stream.

12. The system of claim 11, wherein the sample point of said primary measurement analyzer is positioned along the side stream after the first and the second addition points.

13. The system of claim 12, additionally comprising a secondary point of measurement, wherein the sample point of said secondary point of measurement is positioned in the main stream after the returning point.

14. The system of claim 11, wherein said primary measurement analyzer measures the level of chlorine dioxide.

15. The system of claim 11, wherein said first algorithm is P1DR=(a)ODR, where:

P1DR is a dose rate at said first addition point; a is the nominal fraction of the total chlorine dioxide addition that is provided at said first addition point, and ODR is a predetermined target dose rate, and wherein the dose rate P1DR at said first addition point is added based on dilution into the main flow as determined by periodic, semi-continuous, or continuous measurement of said main flow.

16. The system of claim 11, wherein said second algorithm is P2DR=(b)ODR+(P1DR−X)(F), where P1DR is a dose rate at said first addition point, ODR is a predetermined target dose rate, b is the nominal fraction of the total addition of chlorine dioxide at said first and second addition points, where a+b=1.0, X is data output from primary measurement analyzer, P2DR is dose rate at said first addition point; and F is a selected adjustment factor, and wherein the dose rate P2DR at said second addition point is added based on dilution into the main flow as determined by periodic, semi-continuous, or continuous measurement of said main flow.

* * * * *